US008860971B2

(12) United States Patent
Utsunomiya et al.

(10) Patent No.: US 8,860,971 B2
(45) Date of Patent: Oct. 14, 2014

(54) PRINTING DEVICE AND PRINTING METHOD OF PRINTING DEVICE

(71) Applicant: Seiko Epson Corporation, Tokyo (JP)

(72) Inventors: Kohei Utsunomiya, Nagano (JP); Shinichi Arazaki, Fujimi-machi (JP); Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 13/673,297

(22) Filed: Nov. 9, 2012

(65) Prior Publication Data

US 2013/0128307 A1 May 23, 2013

(30) Foreign Application Priority Data

Nov. 22, 2011 (JP) ................................ 2011-254705

(51) Int. Cl.

| | |
|---|---|
| ***G06F 3/12*** | (2006.01) |
| ***G06F 15/00*** | (2006.01) |
| ***H04N 1/40*** | (2006.01) |
| ***G06F 9/46*** | (2006.01) |
| ***G06F 1/32*** | (2006.01) |
| ***G06F 9/50*** | (2006.01) |
| ***G06K 15/02*** | (2006.01) |

(52) U.S. Cl.

CPC .............. *G06F 3/1296* (2013.01); *G06F 1/329* (2013.01); *Y02B 60/1267* (2013.01); *G06F 9/5027* (2013.01); *G06F 1/3206* (2013.01); *G06F 1/3287* (2013.01); *G06K 15/1856* (2013.01); *G06F 1/3284* (2013.01)

USPC ........... 358/1.13; 358/1.9; 358/443; 358/448; 718/104

(58) Field of Classification Search

None

See application file for complete search history.

(56) References Cited

U.S. PATENT DOCUMENTS

2005/0002050 A1* 1/2005 Yamamoto .................. 358/1.13

FOREIGN PATENT DOCUMENTS

| | | |
|---|---|---|
| JP | 2009-188985 A | 8/2009 |
| WO | WO-00-27640 A1 | 5/2000 |

* cited by examiner

*Primary Examiner* — Thomas Lett

(74) *Attorney, Agent, or Firm* — Global IP Counselors, LLP

(57) ABSTRACT

The printing device has a data generating section (controller section) which conducts image processing with a plurality of processors to generate dot data for printing from image data; and a printing section that conducts printing to a printing medium based on the dot data sent from the data generating section. The data generating section has a first processing mode that conducts processing to first image data that is a part of image data using N processors, and a second processing mode that conducts processing to second image data that is a part of image data using M processors, with N and M representing the number of the processors. N and M are natural numbers which are different from each other. The first processing mode and the second processing mode are determined depending on complexity of the image data.

13 Claims, 5 Drawing Sheets

PRINTING DEVICE AND PRINTING METHOD OF PRINTING DEVICE

CROSS-REFERENCE TO RELATED APPLICATIONS

This application claims priority to Japanese Patent Application No. 2011-254705 filed on Nov. 22, 2011. The entire disclosure of Japanese Patent Application No. 2011-254705 is hereby incorporated herein by reference.

BACKGROUND

1. Technical Field

The present invention relates to a printing device provided with a plurality of processors, and a printing method of the printing device.

2. Background Technology

A printing device generates print data (ON/OFF data of dots) by conducting various kinds of image processing such as color conversion processing or halftone processing to input image data (for example, JPEG image data), and executes printing of an image. Image processing is conducted by a CPU (Central Processing Unit) of the printing device. A technology has been proposed in which a plurality of CPUs are provided in a printing device and image processing is conducted at high speed by causing the plurality of CPUs to share processing (for example, see Patent Document 1).

Japanese Laid-open Patent Application No. 2009-188985 (Patent Document 1) is an example of the related art.

SUMMARY

Problems to be Solved by the Invention

However, according to the well-known technology, depending on the kind of printing data, it often happens that while one processor is conducting processing, another processor is in a waiting state because it has no processing to be conducted. This causes a problem that processing cannot be conducted at sufficiently high speed. There is also another problem that even if the data size of image data is small, power consumption of processors becomes large when a plurality of processors are simultaneously driven.

The invention has been made to address the above-described circumstances, and an advantage of the invention is to provide a printing device and a printing method of the printing device which can quickly conduct image processing to complicated image data having a large volume and having a frequently-changing contrast, and are excellent in power-saving performance by efficiently driving processors.

Means Used to Solve the Above-Mentioned Problems

The invention has been made to address at least part of the above-described circumstances, and can be implemented as the following embodiments and application examples.

Application Example 1

A printing device has a data generating section which conducts image processing with a plurality of processors to generate dot data for printing from image data; and a printing section that conducts printing to a printing medium based on the dot data sent from the data generating section. In the printing device, the data generating section has a first processing mode that conducts processing to the image data using N processors, and a second processing mode that conducts processing to the image data using M processors, with N and M representing the number of the processors. N and M are natural numbers which are different from each other. The first processing mode and the second processing mode are conducted depending on complexity of the image data.

In Application Example 1, the data generating section conducts the first processing mode or the second processing mode depending on the complexity of the image data with respect to a processing mode of generating dot data for printing from image data. The first processing mode is a mode in which processing is conducted to first image data that is a part of image data using N processors, and the second processing mode is a mode in which image processing is conducted using M processors. Here, N and M represent the number of the processors, and N and M are a different number. That is, the data generating section conducts image processing with different numbers of processors based on the difference in the complexity of image data.

Application Example 2

According to Application Example 2, in the printing device, the data generating section determines that N is smaller than M in a state where the complexity of the image data is great. In this application example, the data generating section conducts image processing in a short period of time with the increased number of processors in a state where the complexity of the image data is great, which makes it possible to correspond to the printing section that can conduct printing to a printing medium at high speed. Also, the data generating section decreases the number of processors in a state where the complexity of the image data is small, which makes it possible to reduce power consumption of the processors.

Application Example 3

According to Application Example 3, the printing device can be configured such that the complexity is a value obtained from the degree of change in derivative values of tone values with respect to adjacent pixels of the image data.

Application Example 4

According to Application Example 4, in the printing device, the data generating section is configured such that power consumption of the processors when the second processing mode is conducted is larger than power consumption of the processors when the first processing mode is conducted.

Application Example 5

According to Application Example 5, in the printing device, the data generating section is configured such that a heat generation amount of the processors when the second processing mode is conducted is larger than a heat generation amount of the processors when the first processing mode is conducted.

Application Example 6

According to Application Example 6, in the printing device, the data generating section is configured such that a unit processing amount of image data is divided into a plurality of regions; and the plurality of processors share image processing by conducting the processing to each region, the unit processing amount being a size of image data to which image processing can be conducted by switching the first processing mode and the second processing mode.

Application Example 7

According to Application Example 7, in the printing device, image data within the regions is divided in a direction perpendicular to a feed direction of the printing medium when printing is conducted to the printing medium. In this application example, preferably, the processor uses a means for independently processing each pixel as a means for processing each region. This is because trouble will not occur in processing at the boundary between the regions.

Application Example 8

According to Application Example 8, in the printing device, image data within the regions is divided in a feed direction of the printing medium when printing is conducted to the printing medium. In this application example, preferably, the processor uses a means for independently processing each pixel as a means for processing each region. This is because trouble will not occur in processing at the boundary between the regions.

Application Example 9

According to Application Example 9, in the printing device, the data generating section is configured such that the processing mode is switched from the first processing mode to the second processing mode in a state where an amount of dot data generated per predetermined period of time exceeds an amount of dot data that can be printed in the predetermined period of time. In this application example, since the data generating section is configured such that the processing mode is changed from the first processing mode to the second processing mode in a state where an amount of dot data generated per predetermined period of time exceeds an amount of dot data that can be printed in the predetermined period of time, the printing section can conduct printing to a printing medium without waiting dot data to be sent from the data generating section.

Application Example 10

According to Application Example 10, in the printing device, the processing mode moves from the first processing mode to the second processing mode in a state where the printing section stops printing. In this application example, since the processing mode moves from the first processing mode to the second processing mode in a state where the printing section stops printing, a waiting state of the printing section can be decreased.

Application Example 11

According to Application Example 11, a printing method has the steps of conducting image processing to generate dot data for printing from image data with a plurality of processors; and conducting printing to a printing medium based on the dot data. The printing method has a first processing mode that conducts processing to the image data using N processors, and a second processing mode that conducts processing to the image data using M processors, with N and M representing the number of the processors. N and M are natural numbers which are different from each other. The first processing mode and the second processing mode are conducted depending on complexity of the image data.

BRIEF DESCRIPTION OF THE DRAWINGS

Referring now to the attached drawings which form a part of this original disclosure.

DETAILED DESCRIPTION OF EXEMPLARY EMBODIMENTS

Next, implementation of the invention will be explained based on embodiments.

A. First Embodiment

Figure 1:
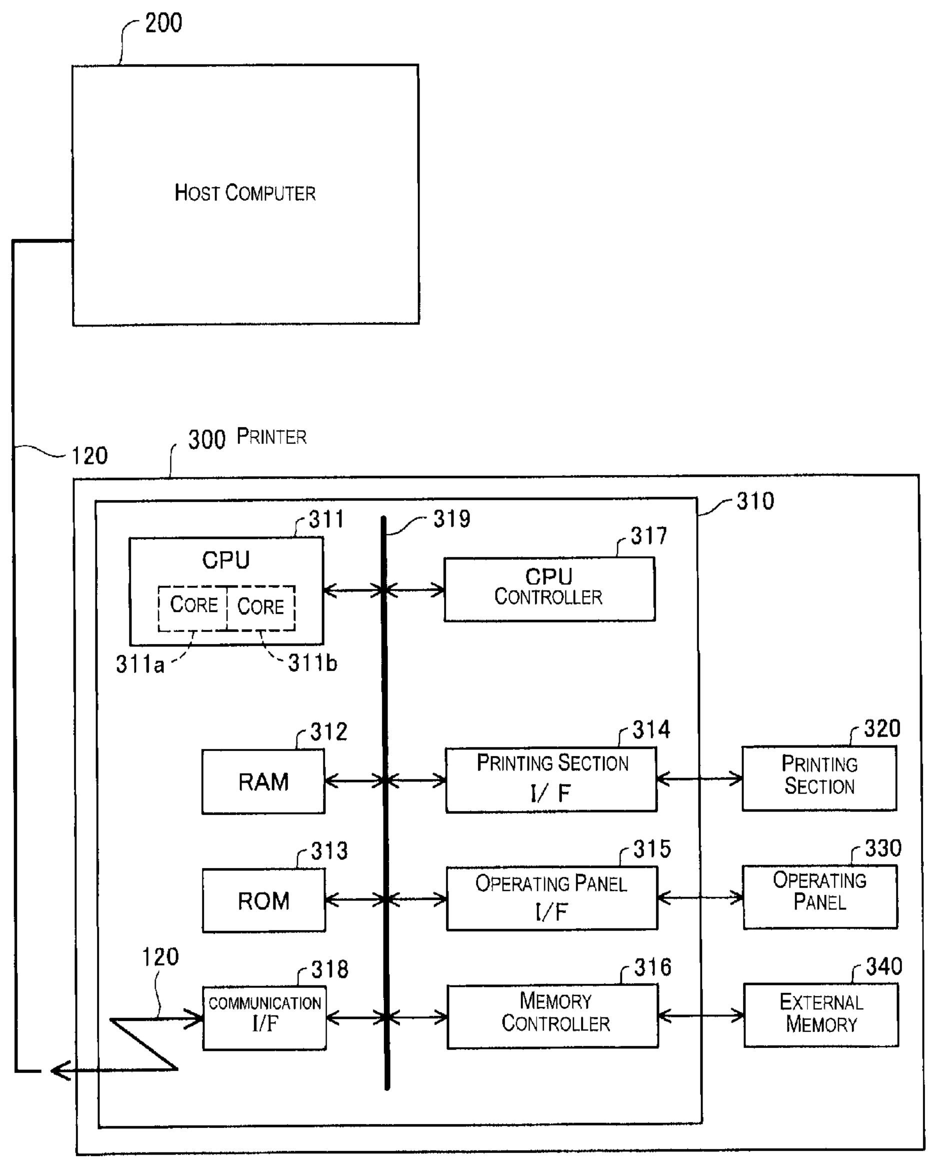
FIG. 1 is an explanatory diagram schematically showing a configuration of a printing device according to a first embodiment of the invention.

FIG. 1 is an explanatory diagram schematically showing a configuration of a printing device 300 according to a first embodiment of the invention. In the present embodiment, the printing device 300 is a so-called line head printer. The printing device 300 can print 60 pages or more per minute at high speed.

The printing device 300 has a controller section 310, a printing section 320 controlled by the controller section 310, an operating panel 330, and an external memory 340. The controller section 310 has a CPU 311, a RAM 312, a ROM 313, a printing section interface (I/F) 314, an operating panel interface (I/F) 315, a memory controller 316, a CPU controller 317, and a communication interface (I/F) 318. These elements 311-318 are connected to each other by a bus 319. The printing section 320 is connected to the printing I/F 314. The operating panel 330 is connected to the operating panel I/F 315. The external memory 340 is connected to the memory controller 316. A USB cable is connected to the communication I/F 318.

The CPU 311 is a so-called multi-core processor. In the present embodiment, the CPU 311 has a first processor core 311*a* and a second processor core 311*b*, and the first processor core 311*a* and the second processor core 311*b* share image processing. This sharing is ordered by the CPU controller 317 to the CPU 311. The first processor core 311*a* and the second processor core 311*b* conduct various kinds of image processing such as color conversion processing or halftone processing to image data as a print object (for example, JPEG, GIF image data) by executing an image generating program stored in the ROM 313, and generate dot data for printing (ON/OFF data of dots). The controller section 310 corresponds to the above-described data generating section.

The printing section 320 has an ink cartridge for storing ink, a printing head, and a working section necessary for actually generating an image to a printing medium. The ink includes, for example, four kinds such as cyan (C), magenta (M), yellow (Y), and black (K). The operating panel 330 is an operating section for a user conducting various kinds of settings on print processing. A user can give instructions regarding settings on the kind or size of a printing medium, or a print cancelling operation to the controller section 310 by operating the operating panel 330. The external memory 340 is an auxiliary storage device which allows a user to load a memory card and the like. Next, an explanation will be made on image processing conducted by the printing device 300 to image data sent from a host computer 200, the external memory 340, and the like.

Figure 2:
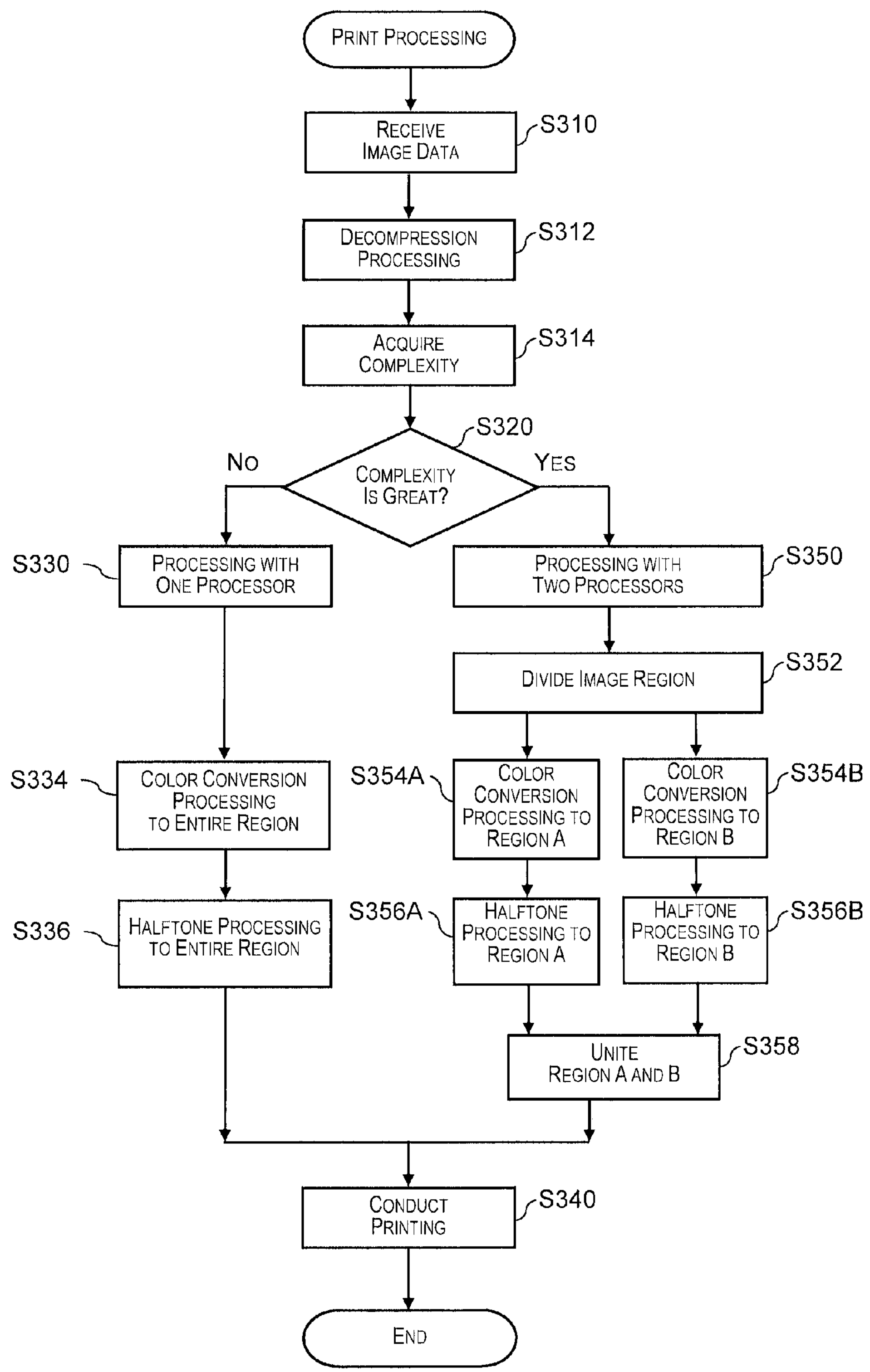
FIG. 2 is a flow chart explaining print processing conducted in the printing device.

FIG. 2 is a flow chart explaining print processing conducted in the printing device 300. The print processing is started by receiving image data sent from the host computer 200 and the like. When the print processing is started, the controller section 310 receives image data from the host computer 200 through the USB cable 120 and the communication I/F 318, and stores the image data in the RAM 312 (step S310). Then, if the image data is compressed data, the CPU controller 317 determines the compression method based on header information of the compressed image data stored in the RAM 312. Specifically, from the header information, if the image data file is a compressed file such as JPEG or GIF, the CPU 311 conducts decompression processing to the compressed image data by a data decompression method corresponding to the compressed file (step S312). Image data decompressed by the CPU 311 is temporarily stored in the RAM 312.

Next, in step S314, the complexity is acquired with respect to the image data stored in the RAM 312. Here, the volume of the image data for acquiring the complexity can be set to a data amount of a region of one page stored in the RAM 312 or a part thereof, for example. As one example, the complexity can be expressed by the magnitude of the degree of change in tone values with respect to adjacent pixels in a region of one page of the image data, or a part thereof. The complexity is obtained by arithmetic processing with the following equation:

[Equation 1]

$$Cfx=\Sigma|D\_ifx|^2 \qquad (1)$$

Equation 1 expresses a contrast "Cfx" of image data. Here, "fx" is a function of image data expressing a tone value such as brightness of each pixel, and "D_ifx" means that "fx" is differentiated in "i" direction of a print object. "i=1" is "x" direction and "i=2" is "y" direction. Accordingly, "D_ifx" is a value obtained by differentiating "fx" in "x" direction or "y" direction. In terms of "fx" as a continuous function, "D_ifx" can be considered as a derivative value, and in terms of a discrete value of adjacent pixels, "D_ifx" can be considered as the difference in a tone value. Here, when D1 represents a value obtained by differentiating an image "fx" in "x" direction and D2 represents a value obtained by differentiating an image "fx" in "y" direction, the contrast "Cfx" of image data is the sum of a square value of an absolute value of each pixel value of D1 and D2 as expressed by equation 1. Since "Di" can be negative, a square value is used an evaluation value.

[Equation 2]

$$Kfx=\Sigma|D\_ijfx|^2 \qquad (2)$$

Equation 2 expresses complexity "Kfx" of image data. Here, "D_ijfx" means that "D_ifx" is further differentiated in "j" direction of a print object. "j=1" is "x" direction and "j=2" is "y" direction. Accordingly, "D_ijfx" is a value obtained by differentiating "D_ifx" in "x" direction or "y" direction. In terms of "fx" as a continuous function, "D_ijfx" can be considered as a double derivative value, and in terms of a region including adjacent pixels, "D_ijfx" can be considered as the degree of change in the difference in tone values. Here, when D11 represents a value obtained by differentiating D1 in "x" direction, D12 represents a value obtained by differentiating D1 in "y" direction, D21 represents a value obtained by differentiating D2 in "x" direction, and D22 represents a value obtained by differentiating D2 in "y" direction, the complexity "Kfx" of image data is the sum of a square value of D11, D12, D21 and D22 as expressed by equation 2. Since "Dij" can be negative, a square value is used an evaluation value.

Figure 3:
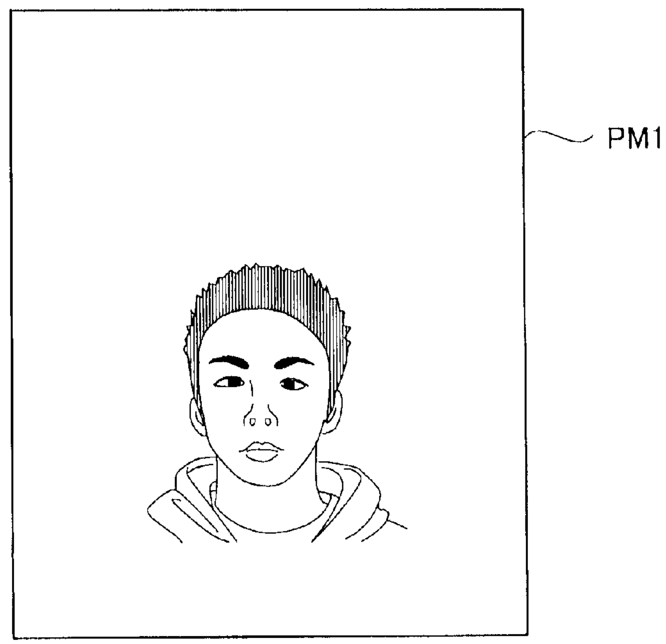
FIG. 3 is an explanatory diagram explaining one example of an image printed on a printing medium based on image data.
Figure 4:
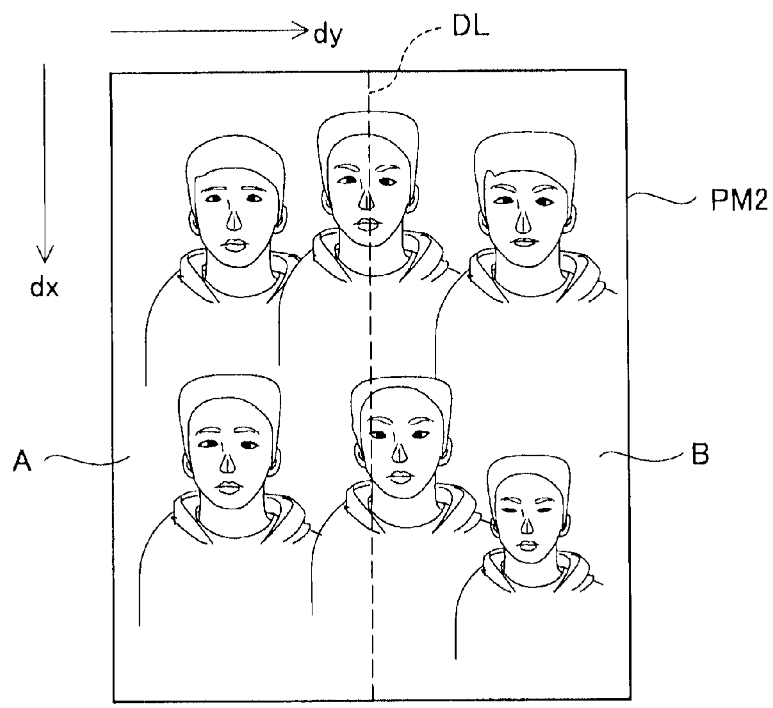
FIG. 4 is an explanatory diagram explaining one example of an image printed on a printing medium based on image data.

Accordingly, the complexity "Kfx" becomes a great value when the difference (derivative value) in tone values of adjacent pixels is great and the difference in the tone values frequently changes. FIG. 3 and FIG. 4 are an explanatory diagram explaining one example of an image printed on printing mediums PM1 and PM 2 based on image data. FIG. 3 shows a print object including one person, and FIG. 4 shows a print object including a plurality of persons (six). When the complexity of equation 2 is acquired with respect to image data of the print objects shown in FIG. 3 and FIG. 4, the complexity "Kfx" obtained with respect to the image data shown in FIG. 4 is greater than with respect to the image data shown in FIG. 3 because the degree of change in tone values is great due to the plurality of persons.

As shown in FIG. 2, in step S320, the CPU controller 317 determines which processing mode will be used for image data by judging the magnitude of the complexity obtained in step S314. Specifically, when the CPU controller 317 judges that the complexity of image data is smaller than a predetermined value, it goes to step S330, and it is determined that image processing will be conducted by the first processor core 311*a* that is one of the processor cores of the CPU 311. Next, in step S334, color conversion processing is conducted to the entire region (one page) of the image data that is temporarily stored in a buffer. For example, when it is judged that the complexity of image data is small with respect to a simple image such as an image shown in FIG. 3, color conversion processing is conducted to the entire region of the image data. The color conversion processing is processing to convert values (R, G, and B) recorded in pixel data that constitutes each pixel of image data into ink amount data of ink colors (C, M, Y, and K) of the printing device 300. In the present embodiment, the color conversion processing is conducted using a lookup table (hereinafter, also referred to as color conversion LUT). The color conversion LUT is a three-dimensional lookup table that is constructed by axes of three tone values of red (R), green (G), and blue (B). At each grid point, each ink amount data of cyan (C), magenta (M), yellow (Y), and black (K) is stored. The color conversion LUT is stored in the ROM 313. The first processor core 311*a* reads the color conversion LUT from the ROM 313, applies it to image data, and thereby the color conversion processing is conducted.

Next, in step S336, the first processor core 311*a* conducts halftone processing to the image data in which each pixel is recorded by the ink amount data after the color conversion processing. The halftone processing is multiple-value processing that converts the image data in which each pixel is recorded by the ink amount data into dot data in which each pixel is recorded by ON/OFF of dots. In the present embodiment, the halftone processing is conducted by a dither method. A dither matrix used in the dither method is stored in the ROM 313. The first processor core 311*a* reads the dither matrix from the ROM 313, applies it to the image data recorded by the ink amount data, and thereby the halftone processing is conducted so as to generate dot data.

After the halftone processing, the CPU 311 conducts printing based on the image data recorded as dot data (step S340). Specifically, the CPU 311 controls the printing head and the like as the printing section 320, and forms an image by ejecting each ink of cyan (C), magenta (M), yellow (Y), and black (K) onto a printing medium while feeding the printing medium in a scanning direction. The printing device 300 conducts print processing in this manner. Incidentally, processing to execute printing can be conducted by driving either or both of the first processor core 311*a* and the second processor core 311*b*.

On the other hand, in step S320, when the CPU controller 317 judges that the complexity of image data is greater than a predetermined value, it goes to step S350, and it is determined that image processing is conducted by the first processor core 311*a* and the second processor core 311*b* that are two processor cores of the CPU 311. Next, in step S352, the region of image data is divided. For example, in a case where image data is printed on a printing medium PM2 and the feed direction of the printing medium PM2 is represented by "dx", the image data is divided into a region A and a region B in "dy" direction perpendicular to the "dx" feed direction with a division line DL as a center. Next, the first processor core 311*a* conducts color conversion processing (step S354A) and halftone processing (step 356A) to the image data corresponding to the region A, and the second processor core 311*b* simultaneously conducts color conversion processing (step S354B) and halftone processing (step 356B) to the image data corresponding to the region B. Specifically, the first processor core 311*a* and the second processor core 311*b* respectively read image data corresponding to the divided regions A and B shown in FIG. 4 from the RAM 312, and respectively conduct color conversion processing and halftone processing in the same manner as in step 334 and step S336 described above. Next, in step S358, the image data of the regions A and B to which image processing has been conducted by the first processor core 311*a* and the second processor core 311*b* are united. Next, in step S340, the CPU 311 conducts printing based on the image data recorded as dot data.

Here, when the first processor core 311*a* and the second processor core 311*b* conduct processing to divided image data, it is preferable that each region is processed by processing that does not need image data of the other region, that is, by processing with a highly independent algorithm. In the halftone processing (step 356A, step 356B), for example, a dither method is preferable rather than an error variance method that needs adjacent pixel data to conduct processing to each pixel data. The dither method is a method for binarizing image data of each color by using the dither matrix stored in the ROM 313 and comparing each pixel data with data of the dither matrix, and this processing does not need adjacent pixel data that overrides the regions.

In the present embodiment, processing (steps S330-336) conducted when it is judged that the complexity of image data is small in step S320 corresponds to the above-described processing of the first processing mode, and the number of the processor is 1 (N=1). Processing (steps S350-358) conducted when it is judged that the complexity of image data is great in step S320 corresponds to the above-described processing of the second processing mode, and the number of the processor is 2 (M=2).

In the above-described embodiment, when the complexity of image data is great, the controller 310 conducts the second processing mode that uses a plurality of processors. Consequently, image processing can be conducted to image data in a short period of time, which makes it possible to correspond to the printing section 320 that can print a print object at high speed. Specifically, image data of great complexity tends to frequently cause random access to a memory in which a cache is difficult to work or a branch prediction error in a branch instruction even if the image data has the same size. However, image processing can be conducted to image data of such great complexity in a short period of time. Also, when the complexity of image data is small, the controller 310 conducts the first processing mode in which the number of the processors is small, which makes it possible to reduce power consumption of the processors.

B. Second Embodiment

Figure 5:
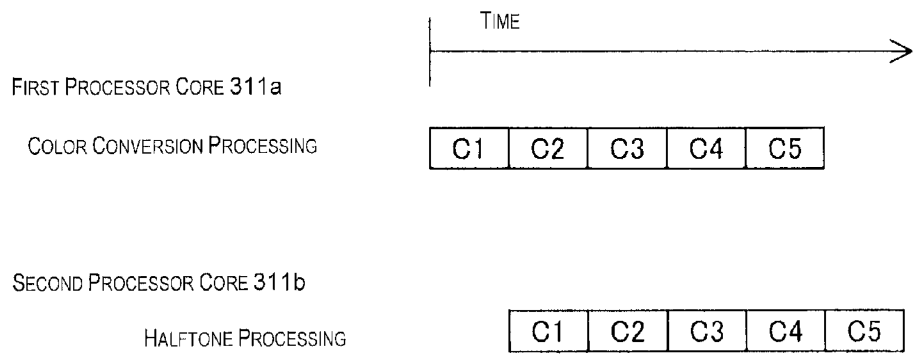
FIG. 5 is an explanatory diagram showing a state where image processing is conducted by pipeline processing using a plurality of processors according to a second embodiment.
Figure 6:
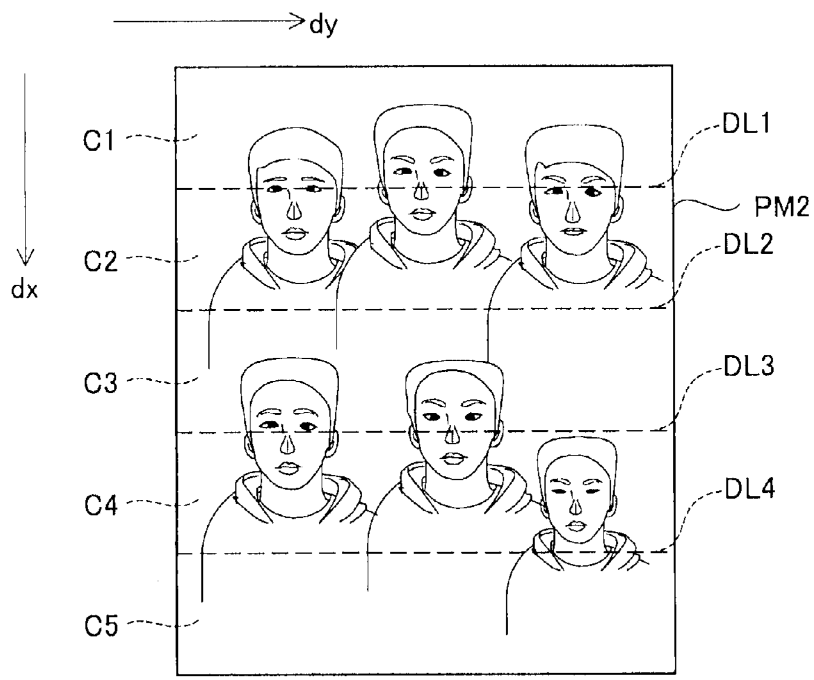
FIG. 6 is an explanatory diagram explaining one example of an image printed on a printing medium based on image data.

FIG. 5 is an explanatory diagram showing a state where image processing is conducted by pipeline processing using a plurality of processors. FIG. 6 is an explanatory diagram showing a print object in which image data is divided into five on a printing medium. Pipeline processing refers to a processing method in which processing elements are coupled in series in a computer, and processing is conducted by arranging such that output of an element becomes input of the next element. The example of FIG. 5 explains a state where processing is conducted by dividing image data as a print object into five portions. Specifically, in FIG. 6, image data as a print object is divided into regions "C1", "C2", "C3", "C4" and "C5" of each image data by division lines DL1, DL2, DL3 and DL4 in "dx" direction that is a feed direction of a printing medium PM2. The volume of image data in each of the regions "C1", "C2", "C3", "C4" and "C5" is set to an image data size that enables switching between the first processing mode and the second processing mode as a unit processing amount.

In FIG. 5, when it is judged that the complexity of image data is great, the controller section 310 conducts processing to image data as a print object using the first processor core 311*a* and the second processor core 311*b* (second processing mode). Specifically, the first processor core 311*a* serves as a processor exclusive for color conversion processing, and sequentially conducts color conversion processing to each image data of the regions "C1", "C2", "C3", "C4" and "C5". The second processor core 311*b* serves as a processor exclusive for halftone processing. When the first processor core 311*a* conducts color conversion processing to the image data of the region "C1", the second processor core 311*b* conducts halftone processing to the image data of the region "C1". Further, the second processor core 311*b* conducts halftone processing to the image data of "C2", "C3", "C4" and "C5" to which processing in the first processor core 311*a* has been completed. With this pipeline processing, image processing can be speeded up. In this case, also, a print object is divided into each region in the feed direction "dx", and it is preferable to conduct processing with a highly independent algorithm as described above, so that processing can be facilitated at the boundary between the divided regions.

C. Third Embodiment

Figure 7:
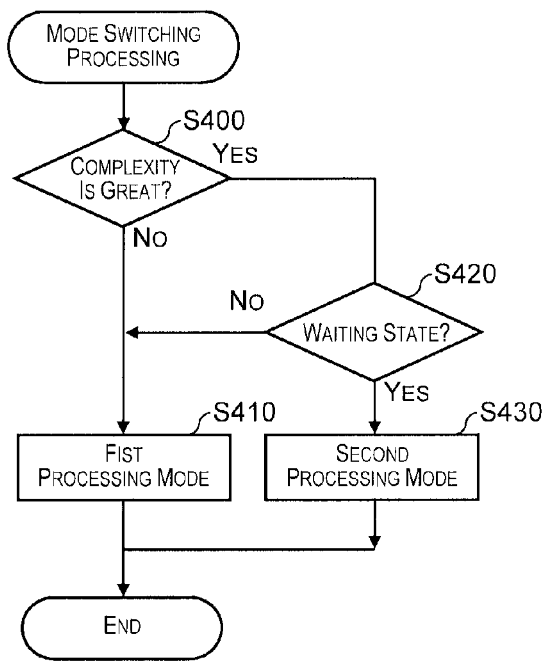
FIG. 7 is a flow chart explaining mode switching processing according to a third embodiment.

FIG. 7 is a flow chart explaining mode switching processing to switch the first processing mode and the second processing mode in print processing according to a third embodiment. The present embodiment is characterized in that the processing mode is switched depending on the waiting state of the printing section 320 in addition to judgment on the complexity of image data as the conditions of judgment for switching processing of the processing mode. In FIG. 7, when the magnitude of the complexity of image data is judged in step S400, in a case where the complexity is small, it goes to step S410, and processing is conducted by the first processing mode, that is, the processing mode in which processing is conducted with a small number of processors. On the other hand, in a case where the complexity of image data is great in step S400, the waiting state of the printing section 320 is judged in step S420. Here, as the conditions of judging the waiting state, the CPU controller 317 judges whether the amount of dot data generated per predetermined period of time exceeds, or can be expected to exceed the amount of dot data can be printed in a predetermined period of time. Incidentally, a state where the print section 320 actually stopped can be considered as the conditions of judging the waiting state. When it is judged that the printing section 320 is in the waiting state in step S420, the processing mode moves from the first processing mode to the second processing mode where the number of the used processors is great. Accordingly, even if the complexity of image data is great, when the printing section 320 is not in the waiting state, the number of the driven processors is made as small as possible, and thus power saving is achieved. Also, the printing section can conduct printing on a printing medium without waiting for dot data to be sent from the controller section 310.

D. Fourth Embodiment

Figure 8:
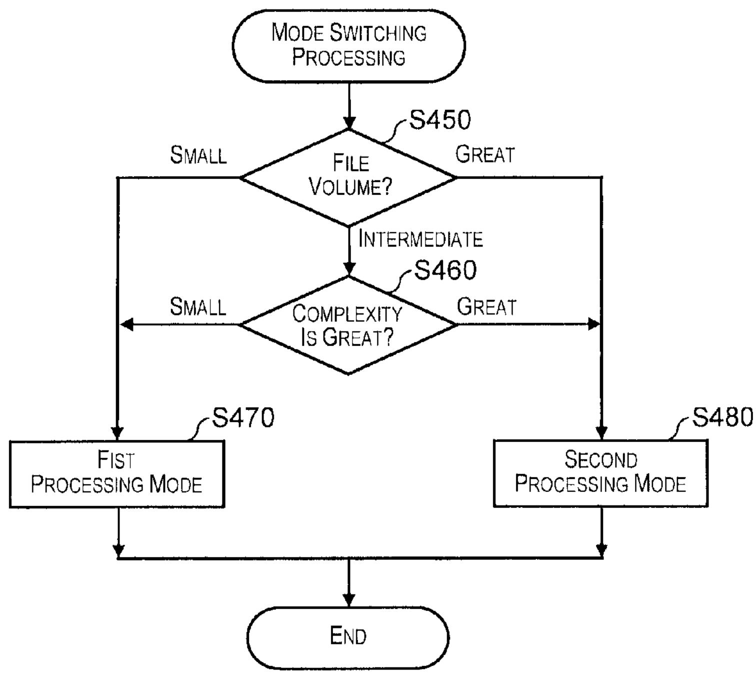
FIG. 8 is a flow chart explaining mode switching processing according to a fourth embodiment.

FIG. 8 is a flow chart explaining mode switching processing to switch the first processing mode and the second processing mode in print processing according to a fourth embodiment. The present embodiment is characterized in that the processing mode is switched depending on a data size of a file in addition to judgment on the complexity of image data as the conditions of judgment for switching processing of the processing mode. In FIG. 8, when the controller section 310 judges the data size of the received file, in a case where the data size is smaller than a first judgment value, it moves to the first processing mode (step S470), and in a case where the data size is greater than a second judgment value (which is greater than the first judgment value), it moves to the second processing mode (step S480). In a case where the data size is intermediate between the first judgment value and the second judgment value, the complexity of image data is judged (step S460), and the first processing mode or the second processing mode is selected. According to this embodiment, when the data size of the file is great or small, the complexity of image data is not judged. Only when the data size is intermediate, the complexity is judged. Consequently, processing time for judging the complexity can be eliminated, and quick image processing can be achieved.

E. Modified Embodiment

The first embodiment to the fourth embodiment are described above. However, the invention is not limited to these embodiments, and various configurations can be possible without departing from the scope of the invention. For example, the functions achieved by software can be achieved by hardware. Also, the following modifications are possible.

(E)-1

In each of the above-described embodiments, by using a multi-core processor as the CPU 311, a plurality of processors are installed on the printing device 300. Alternatively, a plurality of CPUs (processors) can be installed on the printing device 300. Also, in each of the above-described embodiments, two processor cores are used. However, three or more processor cores can be used. In such a case, three or more processor cores can be divided into two groups, and processing can be shared by the first group of processors and the second group of processors.

(E)-2

In the above-described embodiments, the complexity of image data is judged page by page. However, the invention is not limited to this, and the complexity can be judged with respect to a part of a region formed by dividing image data. For example, since a region of frequently-changing brightness or color is often located in the central area of a print object, the complexity can be judged with respect to image data of the central area.

(E)-3

Regarding regions into which image data is divided, dividing into various regions is possible as long as it is within the unit processing amount of image data to which image processing can be conducted by switching the first processing mode and the second processing mode, and the number of the processors can be increased or decreased corresponding to this.

(E)-4

Regarding adjacent pixel data for judging the complexity of image data, it can be possible to use a value that clearly shows the difference between the adjacent pixels such as color, as well as brightness. Also, regarding the range to be judged, it can be possible to judge with one pixel, or judge between each group by making a group of a plurality of adjacent pixels and calculating an average value thereof (E)-5

As the conditions of judging the complexity of image data, it can be possible to add the kind of an image. Specifically, since the complexity of image data changes depending on the kind of image data, that is, whether the image data is black and white or color, gradation of black and white, or the number of tones of color, these elements can be added for judgment of switching the processing mode.

(E)-6

As the conditions of judging the complexity of image data, it can be possible to add the compression ratio of image data. The data of head information of an image file includes a file data size, and the number of pixels in the vertical direction and the number of pixels in the horizontal direction. The number of all pixels can be calculated from these. The compression ratio can be defined by Ds/Ps, where Ds represents a data size and Ps represents the number of pixels of image data among the data of head information of an image file. There are cases where the data size of image data is large even if image data has the same number of pixels and is compressed by the same compression method. This is because compression is not sufficiently conducted in order to avoid deterioration of the image quality due to the compression. It is thus possible to consider image data which cannot be compressed at a large compression ratio as image data having great complexity. Consequently, judgment of switching the processing mode can be conducted by adding an element of a compression ratio to judgment of the complexity of image data.

The entire disclosure of Japanese Patent Application No. 2011-254705, filed Nov. 22, 2011 is expressly incorporated by reference herein.

What is claimed is:

1. A printing device, comprising:

a data generating section which conducts image processing with a plurality of processors to generate dot data for printing from image data; and a printing section that conducts printing to a printing medium based on the dot data sent from the data generating section, the data generating section having a first processing mode that conducts processing to the image data using N processors, and a second processing mode that conducts processing to the image data using M processors, with N and M representing the number of the processors, and N and M being natural numbers which are different from each other, the first processing mode and the second processing mode being conducted depending on complexity of the image data, the complexity being a value obtained from the degree of change in derivative values of tone values with respect to adjacent pixels of the image data.

2. The printing device according to claim 1, wherein the data generating section determines that N is smaller than M in a state where the complexity of the image data is great.

3. The printing device according to claim 2, wherein the data generating section is configured such that the processing mode is switched from the first processing mode to the second processing mode in a state where an amount of dot data generated per predetermined period of time exceeds an amount of dot data that can be printed in the predetermined period of time.

4. The printing device according to claim 3, wherein the processing mode moves from the first processing mode to the second processing mode in a state where the printing section stops printing.

5. The printing device according to claim 1, wherein the data generating section is configured such that power consumption of the processors when the second processing mode is conducted is larger than power consumption of the processors when the first processing mode is conducted.

6. The printing device according to claim 1, wherein the data generating section is configured such that a heat generation amount of the processors when the second processing mode is conducted is larger than a heat generation amount of the processors when the first processing mode is conducted.

7. The printing device according to claim 1, wherein, the first processing mode and the second processing mode are conducted further depending on a size of the image data.

8. A printing device, comprising:

a data generating section which conducts image processing with a plurality of processors to generate dot data for printing from image data; and a printing section that conducts printing to a printing medium based on the dot data sent from the data generating section, the data generating section has a first processing mode that conducts processing to the image data using N processors, and a second processing mode that conducts processing to the image data using M processors, with N and M representing the number of the processors, and N and M being natural numbers which are different from each other, the first processing mode and the second processing mode being conducted depending on complexity of the image data, the data generating section being configured such that a unit processing amount of image data is divided into a plurality of regions; and the plurality of processors share image processing by conducting the processing to each region, the unit processing amount being a size of image data to which image processing can be conducted by switching the first processing mode and the second processing mode.

9. The printing device according to claim 8, wherein image data within the regions is divided in a direction perpendicular to a feed direction of the printing medium when printing is conducted to the printing medium.

10. The printing device according to claim 9, wherein the M processors includes at least a first and a second processors, the second processing mode conducts at least a first and a second image processings to the image data using the first and the second processors, the first and the second image processings are different from each other, the second processing mode conducts the first image processing to the image data using the first processor, and the second processing mode conducts the second image processing to the image data using the second processor.

11. The printing device according to claim 8, wherein image data within the regions is divided in a feed direction of the printing medium when printing is conducted to the printing medium.

12. The printing device according to claim 8, wherein the data generating section determines that N is smaller than M in a state where the complexity of the image data is great.

13. A printing method, comprising conducting image processing to generate dot data for printing from image data with a plurality of processors; and conducting printing to a printing medium based on the dot data, the printing method having a first processing mode that conducts processing to the image data using N processors, and a second processing mode that conducts processing to the image data using M processors, with N and M representing the number of the processors, and N and M being natural numbers which are different from each other, the first processing mode and the second processing mode being conducted depending on complexity of the image data, the complexity being a value obtained from the degree of change in derivative values of tone values with respect to adjacent pixels of the image data.

* * * * *